United States Patent
Tani et al.

(10) Patent No.: US 6,470,042 B1
(45) Date of Patent: Oct. 22, 2002

(54) PHASE-LOCKED LOOP CONTROLLER FOR A FREQUENCY HOPPING RADIO

(75) Inventors: John Akira Tani, Vancouver; Dion Calvin Michael Horvat, New Westminster, both of (CA)

(73) Assignee: Vtech Communications, Ltd. (HK)

( * ) Notice: Subject to any disclaimer, the term of this patent is extended or adjusted under 35 U.S.C. 154(b) by 0 days.

(21) Appl. No.: 09/442,540

(22) Filed: Nov. 18, 1999

(51) Int. Cl.[7] .............................................. H04B 1/713
(52) U.S. Cl. ...................................................... 375/132
(58) Field of Search ................................ 375/132, 133, 375/134, 135, 376

(56) References Cited

U.S. PATENT DOCUMENTS

| | | | | |
|---|---|---|---|---|
| 4,746,870 A | * | 5/1988 | Underhill | 327/105 |
| 5,870,391 A | * | 2/1999 | Nago | 370/330 |
| 6,252,464 B1 | * | 6/2001 | Richards et al. | 327/107 |
| 6,275,517 B1 | * | 8/2001 | Izumi | 340/825.2 |

\* cited by examiner

Primary Examiner—Don N. Vo
(74) Attorney, Agent, or Firm—Greenberg Traurig

(57) ABSTRACT

A phase-locked loop controller for a frequency hopping communications system which utilizes an indirect addressing scheme to access PLL data is provided. The controller is hardware-implemented, with little or no microcontroller processing overhead required. The controller enables simple synchronization with other units in a communications infrastructure implementation. The controller provides a simple interface for implementing dynamic channel allocation methods. An override port allows external control of the PLL with which the controller is associated. Finally, the controller can control auxilliary aspects of system operation, such as powering down a transmitter while changing PLL tuning.

6 Claims, 2 Drawing Sheets

PHASE-LOCKED LOOP CONTROLLER FOR A FREQUENCY HOPPING RADIO

BACKGROUND OF THE INVENTION

Devices incorporating wireless communications techniques are becoming increasingly prevalent in modern society. An inevitable result of this trend is that frequency spectrums are becoming more crowded and prone to interference. At the same time, consumers are becoming increasingly concerned about the privacy and security of wireless communications. Consequently, systems engineers designing a variety of wireless communications systems, including cellular and cordless telephones, to are increasingly turning to digital spread spectrum signaling methods to achieve greater security, higher signal-to-noise ratio, and more efficient bandwidth utilization than can be achieved by using conventional signaling methods, such as amplitude or frequency modulation without bandwidth spreading.

One popular spread spectrum signaling technique is known as frequency-hopping spread spectrum ("FHSS"). FHSS systems operate by rapidly changing their tuning frequency in a known pattern, referred to as the hop sequence. Multiple users each using different hop sequences can communicate simultaneously over independent communications channels on a single frequency range. However, because FHSS systems rely on the receiver and transmitter rapidly tuning to the desired frequency, many prior art designs require that significant microcontroller processing time be devoted to repeatedly programming a phase-locked loop to tune new channels.

Consequently, one object of the present invention is to provide a hardware-implemented phase-locked loop controller for programming a phase-locked loop, thereby allowing the general purpose microcontroller to devote its processing power to implementing more advanced functionality.

When designing wireless communications systems using portable units, the battery life of the portable unit is a key design parameter. Some prior art FHSS portable units significantly extend their battery life by periodically entering a "sleep" mode, in which many system components are de-powered. However, the portable unit's responsiveness is often significantly compromised, because upon "awakening" from sleep mode the unit must perform a complete resynchronization procedure before to communication with the base unit can resume. Other systems may continuously maintain synchronization albeit at the expense of decreased battery life. It is therefore an object of this invention to provide a phase-locked loop (PLL) controller which allows a transceiver to enter a very low power sleep mode, and yet resume communications immediately upon awakening.

Another aspect of FHSS systems which is especially advantageous is the ability to avoid interference on a particular frequency channel by dynamically changing the channels in the hop sequence, substituting a new "clear" channel frequency for an detected "bad" channel frequency. Therefore, another object of the present invention is to allow simple implementation of dynamic channel allocation.

Phase-locked loop circuits may require specific configuration programming prior to use. Designers may also wish to allow for specific control of the phase-locked loop during diagnostic or other modes of operation. Consequently, it is an object of the present invention to allow for an override of the default hardware-controlled phase-locked loop programming sequence.

Furthermore, in designing a digital wireless communications system, it is often desirable to allow a portable unit to communicate to any one of a plurality of base units spread throughout a region, such as in the case of the implementation of a cellular telephone system. This configuration allows a user of the portable unit to communicate throughout a wide area, while requiring only enough transmit power to reach the nearest base unit. Consequently, portable unit battery life is improved, and interference with other nearby users of the frequency band is decreased. However, to implement such functionality in a FHSS system, transceivers in the portable and base units must have synchronized hop sequences such that a portable unit will be able to communicate to any base unit which is loaded with the same hop sequence. It is therefore an object of this invention to provide a hardware-implemented PLL controller with hop synchronization ports which may be used to synchronize the hop sequences of multiple units in a system.

These and other objects of the present invention will become apparent in light of the present specification and drawing.

SUMMARY OF THE INVENTION

In accordance with the invention, a hardware implemented phase-locked loop controller is provided which utilizes an indirect addressing scheme to access PLL data for repeated programming of a phase-locked loop at a fixed rate. The invention consists of a hop counter, a pattern register, a PLL data table, and a data control circuit.

The hop counter periodically increments its state between zero and a specified maximum value. Upon reaching the maximum value, the counter state is reset back to zero. In accordance with one aspect of the invention, the hop counter may maintain hop sequence synchronization while a transceiver is placed in a low-power sleep mode, thereby allowing instantaneous resumption of communications upon awakening. In accordance with another aspect of the invention, the hop counter may provide for synchronization between multiple transceivers in a communications system. The hop counter can generate a sync signal upon reaching its maximum state, which can be transmitted to additional transceivers in the system to force the simultaneous reset of additional hop counters.

The pattern register is an addressable memory area addressed by the hop counter, which outputs channel numbers comprising the hop sequence. In accordance with one aspect of the invention, the pattern register may include an input whereby an external circuit can write new values to locations in the pattern register, thereby enabling the implementation of dynamic channel allocation techniques without interrupting communications.

The PLL data table converts the channel number to which the phase-locked loop is to be tuned, into the control words which tune the phase-locked loop to the desired frequency. The specific control words may vary according to the design of the phase-locked loop circuit.

The data control circuit provides a programming interface to send the PLL data table output to the phase-locked loop device. For example, many phase-locked loop devices are programmed via a serial programming interface, in which case the data control circuit may include a parallel to serial converter, and may further synthesize clock and frame signals as required by the PLL programming model. Optionally, the data control circuit may also provide signals to control RF circuit functionality, as is desired to effectuate a proper channel change. Finally, the data control circuit may include provisions for an overriding input, through which an external circuit can control the PLL programming regardless of the PLL data table output.

DETAILED DESCRIPTION OF THE INVENTION

Figure 1:
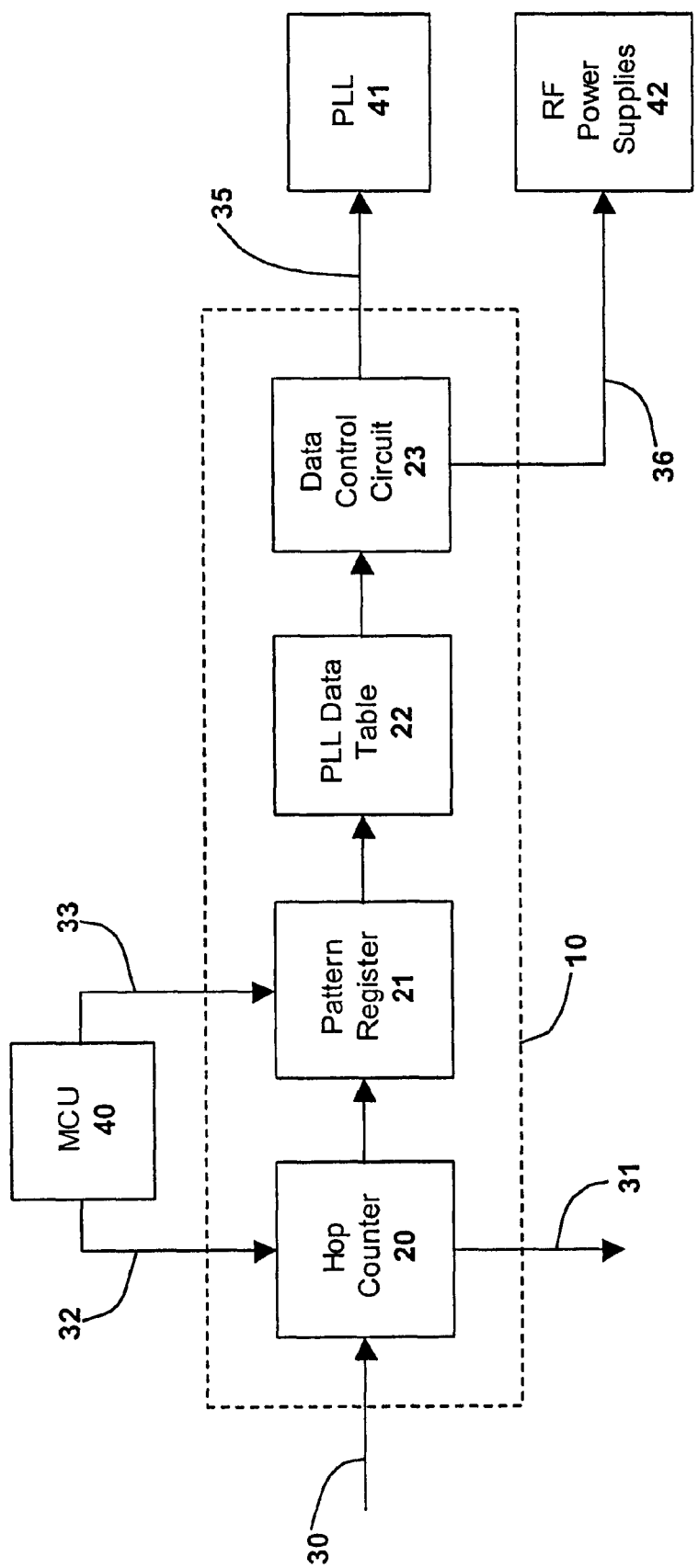
FIG. 1 is a schematic block diagram of one embodiment of the invention, as implemented in a frequency hopping radio system with an external microcontroller which sets the number of frequencies in the hop pattern, and implements dynamic channel allocation, which embodiment also controls auxiliary external circuits via dedicated control lines.

While this invention is susceptible to embodiment in many different forms, there are shown in the drawings and will be described in detail herein several specific embodiments, with the understanding that the present disclosure is to be considered as an exemplification of the principle of the invention and is not intended to limit the invention to embodiments illustrated.

FIG. 1 of the drawings illustrates an embodiment of the present invention comprising a hardware-implemented phase-locked loop ("PLL") controller. Specifically, the PLL controller utilizes an indirect addressing scheme to access PLL data for repeated programming of a PLL at a fixed rate according to a specified sequence of tuning frequencies.

FIG. 1 is a schematic block diagram of the PLL controller 10, and the interconnection between PLL controller 10 and related external circuitry, including PLL 41 and optional microcontroller unit ("MCU") 40. PLL controller 10 is composed of hop is counter 20, pattern register 21, PLL data table 22, and data control circuit 23.

Hop counter 20 includes a counter which increments its state at regular periodic intervals. As commonly implemented in a frequency hopping radio system, hop counter 20 will increment many times per second. When the state of hop counter 20 reaches a maximum state, it is reset to zero and counting up begins anew. The specified maximum state can either be predetermined, or can be set by optional external MCU 40 via connection 32. Connection 32 will generally consist of an electrical connection between MCU 40 and hop counter 20 whereby MCU 40 can program a maximum number of states for hop counter 20.

In some implementations, such as in systems with multiple transceivers, hop counter 20 may include hop synchronization input 30 and hop synchronization output 31. A signal applied to hop sync input 30 forceably resets the hop counter state. Similarly, hop sync output 31 provides a signal after hop counter 20 reaches its maximum state. In a system with multiple transceivers, hop sync output 31 of a first transceiver can be applied to hop sync input 30 of a second transceiver, thereby causing multiple transceivers to step through their respective hop sequences synchronously.

The aforementioned hop sequence synchronization between transceivers can provide several advantages in a communications system involving one or more portable units communicating with multiple base units. The advantages stem from the fact that when hop sequences are synchronized throughout such a system, any portable device can communicate with any base unit by simply loading a common hop sequence. For example, in an office wireless telephone environment, a pool of available base units can be dynamically allocated to corresponding portable units based on portable unit demand, thereby enabling system implementation with a reduced number of base units. Also, by providing multiple base units dispersed throughout the system coverage area, a portable unit need only transmit with sufficient power to be adequately received at the nearest available base unit. The reduced transmission power increases portable unit battery life, and reduces interference with other nearby devices operating simultaneously on the same frequency band. Furthermore, as a portable user moves away from one base unit and towards another, the call can be seamlessly "handed off" between base units without interruption by loading the portable unit's hop sequence into the initiating base unit before ending the connection with the terminating base unit.

Another feature of PLL controller 10 is that hop sequence synchronization can easily be maintained during low-power "sleep mode" operation of a handset transceiver. By maintaining power to only hop counter 20, hop counter 20 will remain synchronized with other devices in the system, except to the extent that any frequency drift of the oscillator internal to hop counter 20 relative to the other devices causes inaccuracies. Other transmit and receive circuitry can therefore be de-powered when not needed to conserve power and maximize battery life. Communications may resume immediately upon the transceiver awakening to full power mode by limiting sleep periods to a length after which any slight frequency drift that has occurred requires only bit alignment rather than a complete sync reacquisition. The acceptable maximum sleep time will depend upon the hop counter oscillator precision and transmission rate (or bit period), and can be determined by one of ordinary skill in the art.

The output of hop counter 20 is electrically connected to the address input of pattern register 21. Pattern register 21 stores the frequency channel numbers comprising the hop sequence in consecutive memory locations. The output of pattern register 21 therefore provides a frequency channel number to PLL data table 22. Pattern register 21 may optionally include memory write port 33. Memory write port 33 allows external circuitry, such as MCU 40, to change the frequency channel contained in any given memory location of the pattern register. Memory write port 33 therefore allows convenient implementation of various dynamic channel allocation techniques. Dynamic channel allocation is an advantageous feature of frequency-hopping radios whereby the effects of fixed-frequency sources of interference or channel degradation can be avoided by removing the frequency upon which communications are impaired from the hop sequence, and replacing it with a new frequency. When interference on the new frequency is less than that on the channel which it replaced, the overall quality of the communications link has been improved. Channel evaluations and allocation decisions are made by MCU 40 in the embodiment illustrated. Several dynamic channel allocation methods are known in the art.

PLL data table 22 contains the PLL command words necessary to program the PLL to each frequency channel. It outputs the command words which program PLL 41 to the frequency indicated by the channel number received from the pattern register. The exact content of the command words will depend upon the design and programming model of the particular PLL utilized, as is known by one of ordinary skill in the art.

The output of PLL data table 22 is electrically connected to data control circuit 23, which actually programs the phase-locked loop device 41 via interface 35. Data control circuit 23 performs the format conversions and implements the programming interface required by the PLL 41 programming protocol. For example, many phase-locked loop devices are programmed via a serial programming interface, in which case the data control circuit includes a parallel to serial converter, and synthesizes clock and frame signals for transmission via interface 35.

Wireless communication devices commonly include both transmitter and receiver circuits. Accordingly, the present invention could be utilized by one of ordinary skill in the art in numerous embodiments to control both transmit and receive PLLs. For example, in an embodiment in which transmit and receive communications are time domain duplexed, and a single PLL is utilized for both transmit and receive circuits, the output of PLL data table 22 may include both transmit and receive PLL programming words. Data control circuit 23 then sequentially programs PLL 41 to the transmit and receive frequencies. Alternatively, if separate PLLs are utilized for transmit and receive circuits, an embodiment of the invention may be utilized which incorporates parallel receive and transmit PLL data tables and data control circuits, such that each PLL is driven by a common hop counter and pattern register, but programmed by separate data tables and control circuits. Such alternative embodiments are within the scope of this invention, inasmuch as they would be known to one of skill in the art in view of the disclosure provided herein.

Figure 2:
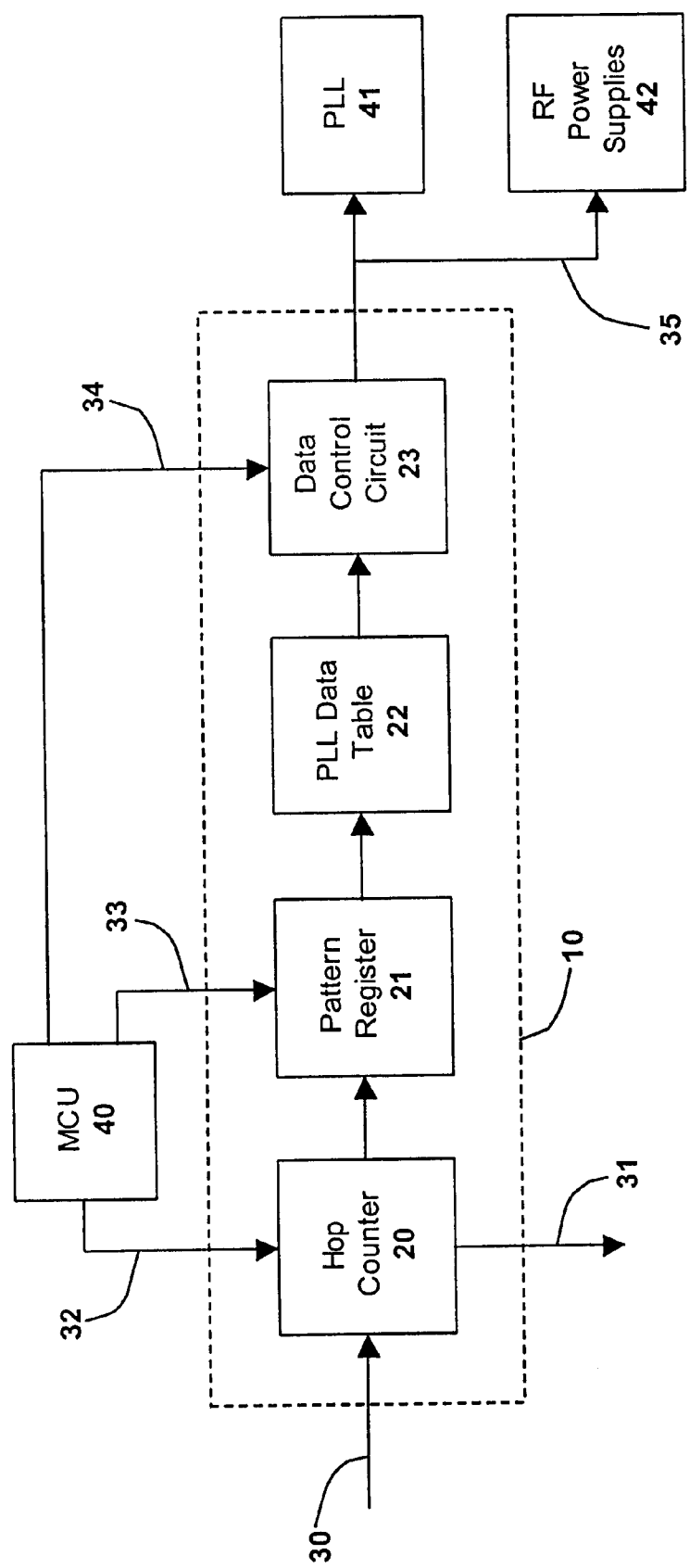
FIG. 2 is a schematic block diagram of another embodiment of the invention, as implemented in a frequency hopping radio system which also allows an external microprocessor to override the default controller operation and program the PLL, which embodiment also controls auxiliary external circuits via a serial interface common to the PLL.

Additionally, data control circuit 23 optionally provides signals to control miscellaneous aspects of RF circuit functionality. For example, it may be desirable to de-power a transmitter and/or receiver during periods of nonuse to conserve power and prolong battery life. Furthermore, t is often desirable to de-power a transmitter while the PLL is changing frequencies, so as to avoid unwanted energy transmission on spurious frequencies during the PLL tuning acquisition. In such example, data control circuit 23 may include miscellaneous control line 36 connected to RF circuit power supplies 42 as depicted in FIG. 1. Data control circuit 23 may then assert line 36 to deactivate supplies 42, thereby turning off the transmitter, before programming PLL 41 with a new tuning. Control circuit 23 can then de-assert line 36 to reactivate supplies 42 after the PLL has locked on to the new frequency, thereby resuming transmission at the new frequency. FIG. 2 illustrates an alternative embodiment in which external power supplies 42 are a node on a common serial programming interface 35, in which case supplies 42 are addressed and controlled via serial commands from data control circuit 23.

Finally, data control circuit 23 may optionally include an overriding input 34, as depicted in FIG. 2. Override input 34 allows external circuit MCU 40 to directly control the output of data control circuit 23, regardless of commands received from PLL data table 22. This feature can be used, for example, to send initialization commands to PLL 41 upon device power-up, or for providing a diagnostic test mode of PLL operation.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

We claim:

1. An electrically-powered circuit for repeatedly transmitting a sequence of programming commands according to a predetermined programming protocol, said circuit comprising:

a counter containing and outputting a state between zero and a maximum state, which counter periodically either increments the state contained therein when the contained state is less than the maximum state, or sets the contained state to zero if the contained state is equal to the maximum state;

an addressable register containing a frequency channel sequence with address input electrically connected to the counter state output;

is a data table circuit with input electrically connected to the addressable register output, and which table's output consists of programming commands corresponding to the table input;

a programming interface circuit with first input electrically connected to the data table output, which interface circuit formats and transmits data received by the first input according to the predetermined programming protocol.

2. The circuit of claim 1, in which the counter further includes means for specifying the maximum state of the counter by an external circuit.

3. The circuit of claim 1, in which the counter further provides a synchronization output signal when the state of the counter reaches a predetermined value.

4. The circuit of claim 1, in which the counter further includes a means for receiving a synchronization input signal which resets the state of the counter to a predetermined value upon receipt of a signal.

5. The circuit of claim 1, which addressable register further includes a write port for writing values into specified register locations by an external circuit.

6. The circuit of claim 1, in which the programming interface circuit further includes a second overriding input which when activated, controls the programming interface circuit regardless of the first input.

* * * * *